US008008523B2

(12) United States Patent
Marchionni et al.

(10) Patent No.: US 8,008,523 B2
(45) Date of Patent: Aug. 30, 2011

(54) PROCESS FOR PREPARING HIGH PURITY MONOCARBOXYLIC PERFLUOROPOLYETHERS

(75) Inventors: Giuseppe Marchionni, Milan (IT); Ugo De Patto, Cogliate (IT); Pier Antonio Guarda, Arese (IT)

(73) Assignee: Solvay Solexis S.p.A., Milan (IT)

( * ) Notice: Subject to any disclaimer, the term of this patent is extended or adjusted under 35 U.S.C. 154(b) by 309 days.

(21) Appl. No.: 12/296,263

(22) PCT Filed: Apr. 3, 2007

(86) PCT No.: PCT/EP2007/053224
§ 371 (c)(1),
(2), (4) Date: Oct. 6, 2008

(87) PCT Pub. No.: WO2007/113293
PCT Pub. Date: Oct. 11, 2007

(65) Prior Publication Data
US 2009/0118550 A1 May 7, 2009

(30) Foreign Application Priority Data

Apr. 6, 2006 (IT) .............................. MI2006A0681

(51) Int. Cl.
*C07C 69/66* (2006.01)
(52) U.S. Cl. ......... 560/145; 560/184; 562/470; 562/472

(58) Field of Classification Search ........................ None
See application file for complete search history.

(56) References Cited

U.S. PATENT DOCUMENTS

| 2,713,593 | A | * | 7/1955 | Brice et al. ..................... 562/586 |
| 3,721,696 | A | * | 3/1973 | Sianesi et al. .................. 558/283 |
| 4,755,330 | A | * | 7/1988 | Viola et al. ..................... 562/849 |
| 6,923,921 | B2 | * | 8/2005 | Flynn et al. .............. 252/182.15 |
| 2004/0147780 | A1 | | 7/2004 | Fontana et al. | |

* cited by examiner

*Primary Examiner* — Rosalynd Keys
(74) *Attorney, Agent, or Firm* — Arent Fox, LLP

(57) ABSTRACT

A process for preparing monocarboxylic perfluoropolyethers of formula: A-O—$(R_F)_z$—$(CFY)_t$—C(O)OX (I) wherein: X is H, $C_1$-$C_{10}$ alkyl, or an aryl group; Y=F, $CF_3$; t=1, 2 or 3; A is a $C_1$-$C_4$ perfluoroalkyl end group; z=0 or 1; $R_F$ is a perfluorooxyalkylene chain; having a number average molecular weight in the range 180-8,000; comprising the following steps: a) one or more distillations of perfluoropolyethers (PFPE) of formula T-O—$(R_F)_z$-T' (II) wherein: z and $R_F$ are as above defined; T, T', equal to or different from each other, are selected from acyl fluoride or carbonyl-containing functional end groups and non functional end groups to obtain one PFPE fraction of formula (II) wherein the difference between the minimum and the maximum molecular weight of the components is lower than or equal to 600; b) partial fluorination of the fraction obtained in a); c) esterification c1) and/or hydrolysis c2) of the mixture obtained in b); d) distillation of the product obtained in c2) or in c1).

26 Claims, No Drawings

PROCESS FOR PREPARING HIGH PURITY MONOCARBOXYLIC PERFLUOROPOLYETHERS

CROSS-REFERENCE TO RELATED APPLICATION

This application is a National Stage entry of International Application No. PCT/EP2007/053224, having an international filing date of Apr. 3, 2007; which claims priority to Italian Application No.: MI2006A 000681, filed Apr. 6, 2006, the disclosure of each of which is hereby incorporated in its entirety by reference.

The present invention relates to a process for obtaining high purity carboxylic monofunctional perfluoropolyether (PFPE) by fluorination of the corresponding di-carbonyl compounds having suitable molecular weight distributions.

More specifically the invention relates to a process for obtaining monofunctional perfluoropolyether (PFPE) having acid or ester functions with purity higher than 98%.

The monofunctional carboxylic PFPEs are generally used as surfactants, to treat surfaces or as precursors for various functionalities, as for example amides or alcohols. The latter can be further transformed into other perfluoropolyether derivatives, for example acrylic, useful for preparing polymers. In the latter case the monofunctional carboxylic perfluoropolyethers and their derivatives must have a high purity. For example, in the preparation of acrylic polymers the presence of bifunctional perfluoropolyethers causes problems during the synthesis as the bifunctional compound brings to the polymer crosslinking.

Furthermore the presence of PFPEs with unreactive (neutral) end groups can cause undesired effects, for example variation of optical properties in acrylic polymers.

To obtain (per)fluorinated monocarbonyl PFPEs in high purity, in particular substantially di-carbonyl and neutral PFPEs free, various processes have been developed in the prior art. For example U.S. Pat. No. 3,250,808 describes perfluoromonoacylfluorides of formula:

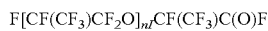

wherein nI is an integer between 1 and 100,
obtained by starting from the perfluoropropene epoxide (HFPO). This process requires the use of very pure epoxide. This is generally obtained by controlled perfluoropropene oxidation. A further drawback is that the solvent used for the polymerization must be substantially anhydrous aprotic dipolar.

U.S. Pat. No. 3,125,599 describes perfluoromonoacylfluorides of formula:

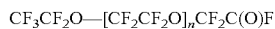

wherein n is an integer between 0 and 50,
obtained from the tetrafluoroethylene epoxide (TFEO). This process also has the same drawbacks mentioned for the process using the perfluoropropene epoxide. Besides, it is well known that the TFEO is particularly dangerous as explosive, so it has to be carefully managed.

Another direct synthesis method of carbonyl monofunctional PFPEs is described in U.S. Pat. No. 5,143,589, EP 393,230 and requires the use of chlorotrifluoroethylene during the tetrafluoroethylene (TFE) and/or hexafluoropropene (HFP) photooxidation. This process has the drawback to produce also PFPE with —CF$_2$Cl end groups. This causes a reduction of the performances, for example oleorepellence, when the PFPE mixture is used in the surface treatment.

Other processes of the prior art are based on the preparation of monocarbonylic, bicarbonylic and neutral perfluoropolyether mixtures and subsequent separation of the monofunctional compounds. For example U.S. Pat. No. 3,847,978 describes the preparation of carboxylic perfluoropolyethers of formula:

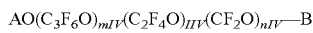

wherein A and B, equal to or different, can be —CF$_2$COOH, —CF(CF$_3$)COOH, —CF$_2$C(O)CF$_3$, —CF$_3$, by reduction of peroxidic perfluoropolyethers. In this process the selectivity in acid type monofunctional is low. Furthermore the possibility of obtaining, from ketonic precursors, carboxylic monofunctional PFPEs is also exemplified wherein the other end group is —OCF$_2$H. However, as known, the monofunctional PFPEs of this type have the drawback to have poor oleorepellence properties.

Other preparation methods of carboxylic monofunctional PFPEs are described in patent applications US 2004/0147778 and US 2004/0147780.

Patent Application US 2004/0147778 describes a multistep process for preparing carbonylic monofunctional PFPEs starting from the corresponding di-carbonylic compounds comprising the partial catalytic fluorination at low temperature of the bifunctional carbonylic PFPE acylfluoride to give the corresponding hypofluorite and the subsequent hypofluorite decomposition. This process is expensive since it has a lot of steps. Besides, for products having a low boiling temperature, the hypofluorite decomposition step must be carried out under pressure to avoid product losses. Besides the hypofluorite decomposition can be dangerous due to the high explosiveness of the same.

US 2004/0147780 describes a single selective fluorination step of the PFPE diacylfluoride with elementary fluorine and a suitable catalyst until the total diacylfluoride conversion. In this way the problem of the hypofluorite decomposition of the previous patent application is avoided. This process allows to obtain monocarbonylic PFPEs in high yields with a simplified process compared to patent application US 2004/0147778. However it has drawbacks similar to those of the previous patent application. As a matter of fact the process operates at temperatures between 40° C. and 200° C. and one must operate under pressure to avoid low boiling temperature product losses. Besides, in this range of temperatures, the contemporaneous presence of elementary fluorine and PFPE in gaseous phase implies explosion risks. Furthermore both processes of patent applications US 2004/0147778 and US 2004/0147780 have the drawback to require a high fluorine consumption. In fact, for effectively separating pure monocarboxylic PFPEs, the complete conversion of the di-carbonyl precursors is necessary. This has the drawback to produce a high amount of neutral PFPEs.

Tests carried out by the Applicant have shown that a mixture formed of monofunctional, bifunctional and neutral PFPEs is obtained when after fluorination the conversion of the di-carbonylic compounds is not complete. The monofunctional compounds in high purity, higher than 98%, are almost impossible to be recovered even by using several distillations and rectifications carried out on the mixture of carbonylic compounds obtained after fluorination and/or on the final mixture. See the comparative Examples. Furthermore the process described in patent application US 2004/0147780 shows that the purity of the monocarboxylic perfluoropolyethers is lower than 98% when the molecular weights are higher than 1,000, notwithstanding the conversion of the starting bifunctional PFPEs is complete (see the Examples of said patent application).

It is also known to separate monofunctional perfluoropolyethers from the corresponding bifunctional and neutral ones by using chromatographic methods or their adsorption on silica. See for example U.S. Pat. No. 5,246,588, U.S. Pat. No. 5,262,057, U.S. Pat. No. 5,910,614, EP 1,614,703. However these methods are applicable only when the PFPE functionality is alcoholic or aminic and they cannot be applied to the carboxylic functionalities (see the comparative Example).

The need was therefore felt to have available a process for obtaining monocarboxylic perfluoropolyethers having the following combination of properties:

able to reach a high purity in carboxylic monofunctional components, preferably higher than or equal to 98%, more preferably higher than or equal to 99%, even at high molecular weights, for example higher than 1,000,
  obtainment of monofunctional PFPEs wherein the end groups are substantially chlorine or hydrogen free,
  no use of solvents as essential component,
  possibility to obtain both linear and branched carboxylic monofunctional perfluoropolyethers,
  no use of explosive reactants or intermediates and use of simple separation operations to recover the products.

The Applicant has surprisingly and unexpectedly found a process for preparing high purity monocarboxylic perfluoropolyethers solving the above technical problem.

An object of the present invention is a process for preparing monocarboxylic perfluoropolyethers having acid and/or esters function, of formula:

$$A\text{-}O\text{---}(R_F)_z\text{---}(CFY)_t\text{---}C(O)OX \qquad (I)$$

wherein:

X=H, a linear or branched, when possible, alkyl radical R with a number of carbon atoms between 1 and 10, or a $C_5$-$C_7$ cyclic radical, optionally containing heteroatoms, for example oxygen; or an aryl, preferably benzyl, radical;

Y=F, $CF_3$;

t is an integer from 1 to 3, t=1 when Y=$CF_3$; t=1, 2 or 3 when Y=F;

A is a linear or branched, when possible, $C_1$-$C_4$ perfluoroalkyl end group, one fluorine atom can be substituted by one chlorine atom and the end groups containing chlorine, when present, preferably being lower than 2% molar with respect to the total of the end groups A;

z is an integer 0 or 1;

$R_F$ is a perfluorooxyalkylene chain containing one or more of the following units statistically distributed along the backbone: $(C_3F_6O)$, $(CFYO)$, wherein Y is F or $CF_3$; $(CF_2CF_2O)$, $(CF_2CF_2CF_2O)$, $(CF_2CF_2CF_2CF_2O)$;

having molecular weight or number average molecular weight in the range 180-8,000, preferably 180-3,000, more preferably 200-1,600;

comprising the following steps:

a) one or more distillations of perfluoropolyethers of formula:

$$T\text{-}O\text{---}(R_F)_z\text{-}T' \qquad (II)$$

wherein:

z and $R_F$ are as above;

T, T', equal to or different from each other, are selected from the functional end groups —$CF_2COF$, —$CF(CF_3)COF$, —$CF_2CF_2COF$, —$CF_2CF_2CF_2COF$, —$CF_2C(O)CF_3$, —COF, and the non functional (neutral) end groups —$CF_3$, —$CF_2CF_3$, —$C_3F_7$, —$C_4F_9$, one fluorine atom can be substituted by one chlorine atom, with the proviso that, when present, the neutral end groups are 20% molar at most with respect to the total of the end groups T and T', preferably the end groups containing chlorine, when present, are lower than 1% molar with respect to the total of the end groups T and T', to obtain a PFPE fraction of formula (II) wherein the difference between the minimum and the maximum molecular weight of the components, defined as molecular weight delta, is lower than or equal to 600, by operating in a temperature range between −50° C. and +300° C. and at a pressure between $10^{-3}$ mbar and 4 bar;

b) partial fluorination of the fraction obtained in a) until obtaining a content of neutral end groups from 40% to 60% molar with respect to the total of the end groups;

c) esterification c1) and/or hydrolysis c2) as follows:

c1) esterification of the mixture obtained in b) with an alcohol R—OH wherein R is as above, in stoichiometric amount with the functional acylfluoride end groups of the mixture obtained in b) and distillation of the formed HF;

or c2) hydrolysis of the mixture obtained in b) with water used in stoichiometric ratio with the functional acylfluoride end groups of the mixture obtained in b) and distillation of the formed HF;

d) distillation of the product obtained in c1) or in c2) by operating at temperatures from +20° C. to +300° C. and under a pressure between $10^{-3}$ mbar and 4 bar, preferably between $10^{-3}$ mbar and atmospheric pressure, so as to obtain a mixture of compounds of formula (I) wherein the molecular weight delta of the components of the mixture is the same of the fraction of the perfluoropolyethers of formula (II) obtained by distillation in step a).

The PFPE fraction of formula (II) obtained in step a) has a difference between the minimum and the maximum molecular weight of the components, i.e. delta, lower than or equal to 600, preferably lower than or equal to 300, more preferably lower than or equal to 200.

The mixture of polymers of formula (I) obtained in step d) has a delta corresponding to that of the starting PFPEs of formula (II) obtained in step a).

The unit $(C_3F_6O)$ can be selected between $(CF_2CF(CF_3)O)$ or $(CF(CF_3)CF_2O)$.

In steps a) and d) the conventional distillation and/or the distillation with rectification can be used.

As said, step a) is carried out so as to obtain a carbonyl PFPE of formula (II) having a well defined molecular weight delta. Said range is selected in function of the type of monofunctional compound of formula (I) (acid or ester) to be obtained. Usually the molecular weight range of the desired monocarboxylic compounds (I) depends on the kind of application. As a matter of fact, a very strict distribution (delta) or a wider one can be required. Besides higher or lower molecular weights can be requested. Due to this, the distillation and/or rectification conditions of step a) and the esterification or hydrolysis reactants of step c1) or c2) are chosen.

$R_F$ is preferably selected from the following classes:

(a) —$(CF_2O)_n(CF_2CF_2O)_m(CF_2CF_2CF_2O)_p(CF_2CF_2CF_2CF_2O)_q$— wherein m, n, p, q are integers, zero comprised, such as to give the number average molecular weights as above; when n is different from zero m/n is preferably between 0.1 and 20; when (m+n) is different from zero (p+q)/(m+n) is preferably between 0 and 0.2, extremes included;

(b) —$(CF_2CF(CF_3)O)_a(CF_2CF_2O)_b(CF_2O)_c(CF(CF_3)O)_d$—
  wherein a, b, c, d are integers, zero comprised, such as to give the number average molecular weights as above; when b is different from zero a/b is preferably between 0.1 and 10; when (a+b) is different from zero (c+d)/(a+b) preferably is between 0.01 and 0.5, more preferably between 0.01 and 0.2;

(c) —$(CF_2CF(CF_3)O)_e(CF_2O)_f(CF(CF_3)O)_g$—
  wherein e, f, g are integers, zero comprised, such as to give the number average molecular weights as above; when e is different from zero (f+g)/e is preferably between 0.01 and 0.5, more preferably between 0.01 and 0.2.

In step b) the fluorination can be carried out by photochemical and/or thermal and/or catalytic way according to U.S. Pat. No. 4,664,766; GB 1,226,566, U.S. Pat. No. 5,319,147, preferably by photochemical way. The fluorination is carried out in a partial way, as it has been found by the Applicant unexpectedly and surprisingly that in the above range the content of monofunctional compounds in the mixture is maximized. In fact, the Applicant has surprisingly and unexpectedly found that it is not necessary to fluorinate up to the complete disappearance of the bifunctional precursor to obtain monofunctionals having a purity higher than 98%.

Therefore in the process of the present invention the fluorine consumption is lower than in the prior art, and results in a fluorine saving of about 20% and in a production of neutral compounds equal to 25% at most with respect to the total of the mixture components. In particular it is preferred to fluorinate until obtaining a content of neutral end groups in the range 40%-50%. The neutral end groups is determined by $^{19}F$-NMR analysis.

The c1) esterification step and its reactant or the c2) hydrolysis step are selected depending on the final compound to be obtained. In particular, to obtain high purities, higher than 98%, the greater the molecular weight delta obtained in step a) (predetermined delta), the higher the molecular weight of the esterification reactant of step c1). Besides, the esterification reactant being equal, the higher the required purity of the monofunctional product of formula (I), the lower the molecular weight delta of the fraction obtained in a).

The molecular weight delta of the compounds obtained in a) is determined by gaschromatographic techniques, in case of products having molecular weights lower than 1,200, and by GPC (Gel Permeation Chromatography) when the molecular weights exceed 1,200. These techniques can be used also in combination with each other.

In case of esterification, i.e. when X=R in formula (I), as said, the PFPE of formula (II) is distilled/rectified in step a) so as to have a predetermined molecular weight delta lower than or equal to 600. In particular, to have purities higher than 98%, preferably higher than 99%, the following conditions are preferred:

when the delta is lower than or equal to 200
    R is a linear, branched when possible $C_1$-$C_{10}$ alkyl group, or cyclic when possible, optionally containing one or more heteroatoms, preferably oxygen; or an aryl, preferably benzyl group;
  when the delta is between 200 and 300 (300 included)
    R=linear or branched when possible $C_4$-$C_{10}$ alkyl or cyclic when possible, optionally containing one or more heteroatoms, preferably oxygen; or an aryl, preferably benzyl group;
  when the delta is between 300 and 400 (400 included)
    R=linear, branched or cyclic $C_6$-$C_{10}$ alkyl optionally containing one or more heteroatoms, preferably oxygen; or an aryl, preferably benzyl group;
  when the delta is between 400 and 500 (500 included)
    R=linear, branched or cyclic $C_7$-$C_{10}$ alkyl optionally containing one or more heteroatoms, preferably oxygen; or an aryl, preferably benzyl group;
  when the delta is between 500 and 600 (600 included)
    R=linear, branched or cyclic $C_8$-$C_{10}$ alkyl optionally containing one or more heteroatoms, preferably oxygen; or an aryl, preferably benzyl group.

When the hydrolysis c2) is carried out, that is, when X=H in formula (I), to obtain purities higher than 98%, preferably 99%, it is preferable that the molecular weight delta of the PFPEs of formula (II) obtained in step a) is lower than or equal to 300.

The dicarbonyl PFPEs of formula (II) used in step a) are known. They can be prepared, for example, starting from peroxidic PFPEs according to EP 1,568,730. Alternatively, the dicarbonyl PFPEs of formula (II) can be prepared according to what described for example in U.S. Pat. No. 5,258,110, U.S. Pat. No. 5,488,181 by polymerization of fluoroolefins as $C_3F_6$ and/or $C_2F_4$ with oxygen at low temperature in the presence of radical initiators, as fluorine or hypofluorites, optionally in the presence of UV light, and subsequent reduction, for example with hydrogen on a suitable catalyst containing palladium, as described for example in U.S. Pat. No. 6,127,498.

The carbonyl PFPEs of formula (II) obtained with the known processes show a wide molecular weight distribution generally between 210 and 8,000.

As said, the Applicant has surprisingly and unexpectedly found that, when di-carbonyl PFPEs are subjected to fluorination having a molecular weight delta lower than or equal to 600, it is possible to obtain the corresponding carboxylic mono-functional compounds with high purities, higher than those obtainable in the prior art, even higher than 98%, preferably higher than 99%, combined with high yields, preferably higher than 90%.

By using the deltas identified by the Applicant it has been found that, to have high purities and yields in monofunctional compound (wherein yield means the yield of the monofunctional compound recovery from the mixture), it is not necessary to carry out the fluorination up to the complete conversion of the di-carbonyl PFPEs of formula (II) as instead taught in the prior art, with the above advantages.

Furthermore it has been found by the Applicant that it is possible to use in step b) also non catalytic fluorinations, such as the photochemical and thermal one in the absence of a catalyst, which, as well known, is not selective in monofunctional.

In the process of the present invention, indeed, to separate the carboxylic monofunctionals with high purities it is sufficient a conversion of 40% of the carbonyl end groups of the starting PFPE instead of a conversion of about 70% of the end groups as disclosed in the prior art (corresponding to the complete conversion of the di-carbonylic compounds). See the Examples of patent application US 2004/0147780.

Furthermore the process of the present invention allows to obtain carboxylic monofunctionals with high purity, higher than 98% and with a yield higher than 90%, even in case of compounds having a high number average molecular weight, for example higher than 1,000.

Some illustrative but not limitative Examples of the present invention follow.

EXAMPLES

Characterization

Yield in Monocarboxylic Perfluoropolyethers
  It is meant the percent amount by weight of carboxylic monofunctional compounds recovered after distillation with respect to the amount of carboxylic monofunctional compounds contained in the fluorinated mixture in step b).

Distribution of the Molecular Weights

The molecular weight distribution of the products is determined with different analytical techniques in function of the molecular weight.

In case of molecular weights lower than 1,200, the gaschromatographic analysis of the sample previously transformed into the corresponding methyl ester is used.

In case of molecular weights higher than 1,200, the GPC technique is used applied to the corresponding methyl ester. When the distribution comprises both lower than and higher than 1,200 molecular weights, the two methods can be combined.

Determination of the Compound Structure

The determination of the structure of the tested compounds is carried out by NMR $^{19}$F and $^{1}$H analysis. Besides, with said analysis, it is possible to determine the relative amounts of the carbonyl end groups and of the neutral end groups and thus the respective percentages.

Purity Determination

With purity it is meant the percent content by weight of carboxylic monofunctional compounds in the tested sample (sample obtained from the distillation d)).

The purity of the products is determined by gaschromatographic analysis of the corresponding methyl ester when the molecular weight does not exceed 1,200.

For molecular weights higher than 1,200 (up to molecular weights of 3,000) the purity is determined by using the method described hereinafter applied to the carboxylic acid.

0.5 g of sample and 1 g of hexafluoroxylene are weighed in a 10 ml centrifuge test tube. 5 g of aqueous solution containing 10% by weight of polyethylenimine with number average molecular weight of 2,000 are added. The mixture is stirred and then centrifuged to separate the phases.

The lower phase mainly formed of non functional products is analyzed by NMR $^{19}$F analysis. The structure, the number average molecular weight and the concentration of neutral compounds contained in the tested sample are determined.

The upper phase, formed of the aqueous solution of the functional components, is twice washed with hexafluoroxylene to remove the last traces of neutral compounds. The resulting aqueous phase, not containing the neutral components any longer, is added with 1 g of hexafluoroxylene, acidified then with 5 g of hydrochloric acid at 37%, and lastly it is centrifuged to recover the lower phase. The latter is analyzed by NMR $^{19}$F analysis. The structure and the number average molecular weight are determined. From the ratio between functional end groups (carboxylic acids) and neutral end groups the content of bifunctional compounds is calculated.

The content of neutral and bifunctional compounds determines the purity in monofunctional components.

Determination of the Mixture Composition

The determination of the percent content of bicarbonyl, monocarbonyl and neutral compounds in the reference mixture is carried out by using the analytical methods already described for the purity determination or gaschromatography of the mixture in the form of methyl ester and separation technique of the mixture in the form of carboxylic acid.

Example 1

Preparation of PFPE Diacylfluoride Fractions of Formula (II) having a Molecular Weight Distribution with a Width Lower than or Equal to 600

To prepare the above fractions one proceeds by operating with the following process.

According to patent application US 2005/0192413 A1 a peroxidic PFPE is prepared which is then chemically reduced by catalytic hydrogenation as described in patent application US 2004/0024153, obtaining a PFPE diacylfluoride having general formula:

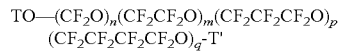

wherein m/n=1.94 and (p+q)/(m+n)=0.014;

T and T' are the chain end groups —$CF_2COF$ and having a number average molecular weight of 790.

12.9 kg of the above obtained diacylfluoride are distilled at atmospheric pressure bringing the boiler temperature up to 290° C. obtaining a distilled fraction (DF) of 5.4 kg and a residue fraction (RF) of 7.0 kg. In cold trap at −70° C., 263 g of light fraction (LF) are recovered.

The RF fraction has the above structure with number average molecular weight (Mn) equal to 1,434 wherein m/n=2.08 and (p+q)/(m+n)=0.0108 and has —$CF_2COF$ end groups.

The DF fraction has the above defined structure with Mn=538 wherein m/n=1.97 and (p+q)/(m+n)=0.0061 and has —$CF_2COF$ end groups.

The LF fraction is mainly formed of a mixture of the following diacylfluorides: $FC(O)CF_2OCF_2COF$ (85.3% molar), $FC(O)CF_2OCF_2OCF_2COF$ (13.3% molar) and $FC(O)CF_2OCF_2CF_2OCF_2COF$ (1.4% molar).

The DF distilled fraction is analyzed by gaschromatographic analysis of the corresponding methyl ester and the analysis shows that the mixture is mainly formed of 20 compounds of formula (II) having molecular weights between 276 and 1,000.

3 kg of diacylfluoride distilled fraction DF are rectified under atmospheric pressure on 5 plate AISI 316 column by operating with a reflux ratio equal to 2. From the rectification three fractions are obtained, each having a molecular weight delta lower than 600 as reported in Table 1.

TABLE 1

| | Fraction | | |
|---|---|---|---|
| | 1 | 2 | 3 (residue) |
| Head temperature (° C.) | 40-88 | 88-174 | >174 |
| Boiler temperature (° C.) | 127-149 | 149-204 | >204 |
| Molecular weight range | <400 | 400-700 | 700-1,000 |
| Fraction weight (grams) | 740 | 1,370 | 880 |
| Yield (% by weight) | 25 | 46 | 29 |
| Mn | 345 | 542 | 847 |
| m/n | 1.97 | 1.96 | 1.98 |
| (p + q)/(m + n) | 0.0012 | 0.0060 | 0.0031 |

Then 2.15 kg of diacylfluoride residue fraction RF previously obtained are subjected to rectification at the pressure of 0.5-0.75 mbar. The rectification takes place in 2 plate AISI 316 column by operating with a reflux ratio equal to 5.

From the rectification of the residue fraction RF three fractions are obtained as reported in Table 2.

TABLE 2

|  | Fraction | | |
|---|---|---|---|
|  | 4 | 5 | 6 (residue) |
| Head temperature (° C.) | 52-107 | 107-158 | >158 |
| Boiler temperature (° C.) | 82-132 | 132-203 | >203 |
| Molecular weight Range | 1,000-1,300 | 1,300-1,600 | >1,600 |
| Fraction weight (grams) | 510 | 650 | 970 |
| Yield (% by weight) | 24 | 30 | 46 |
| Mn | 1,086 | 1,438 | 1,807 |
| m/n | 1.97 | 1.98 | 1.98 |
| (p + q)/(m + n) | 0.013 | 0.011 | 0.010 |

The fraction 4 and the fraction 5 show a molecular weight delta lower than 600.

Then 1.2 kg of diacylfluoride distilled fraction DF are subjected to rectification at atmospheric pressure under the conditions reported in Table 3 on a 5 plate AISI column by operating with a reflux ratio equal to 2. From the rectification two fractions are obtained as reported in Table 3.

TABLE 3

|  | Fraction | |
|---|---|---|
|  | 7 | 8 (residue) |
| Head temperature (° C.) | 40-88 | >88 |
| Boiler temperature (° C.) | 127-149 | >149 |
| Molecular weight range | <400 | 400-1,000 |
| Fraction weight (grams) | 297 | 898 |
| Yield (% by weight) | 25 | 75 |
| Mn | 345 | 661 |
| m/n | 1.97 | 1.96 |
| (p + q)/(m + n) | 0.0012 | 0.0044 | fraction 8 shows a molecular weight delta having a width equal to 600.

Example 2

Preparation of a Fraction of Monofunctional Carboxylic Acids of Formula (I) Having a Molecular Weight Distribution in the Range Between 370 and 670

500 g of the fraction 2 obtained in the Example 1 and having molecular weight between 400 and 700 are fluorinated (step b) by photochemical fluorination according to U.S. Pat. No. 4,664,766, by feeding at atmospheric pressure 2.5 Nl/h of gaseous $F_2$ into the reactor maintained at −20° C. The reaction is activated by using a 150 W UV lamp. The reaction course is followed by NMR analysis. After 10 hours of reaction a product is obtained containing 50% of perfluorinated alkyl end groups determined by NMR analysis.

Then 250 g of fluorinated product having an equivalent weight of 514 are hydrolyzed (step c2) at T=0° C. in a PFA (fluoropolymer) built reactor by adding 8.75 g of water which represent the stoichiometric water amount necessary to the hydrolysis of the acylfluoride end groups. The HF generated is distilled up to 70° C.

A 218.5 g aliquot of mixture obtained from hydrolysis which, analyzed by gaschromatography as described in the characterization, results to contain 50% by weight of monofunctional compounds, is then rectified (step d) in a glass column filled with Raschig rings having a 3 cm diameter and 20 cm height.

By distilling at 51 mbar up to 108° C., 52.8 g of a fraction formed of compounds having both alkyl end groups perfluorinated (neutral compounds) with molecular weights in the range 350-650 are obtained; then by distilling at 0.23 mbar between 38° C. and 79° C., 106.2 g of a fraction containing carboxylic monofunctional PFPEs of formula (I) having molecular weights in the range 370-670 are obtained.

The latter fraction results to have a purity in carboxylic monofunctional PFPEs of formula (I) of 99.2% and contains 0.8% of neutral compounds.

The yield in the recovered monofunctional compound is equal to 96.4% by weight with respect to what contained in the mixture. The structure of the monofunctional carboxylic acid is:

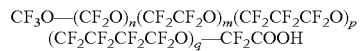

wherein m/n=1.96 and (p+q)/(m+n)=0.0060;
and the number average molecular weight is 517.

A distillation residue of step d) remains equal to 54.1 g formed of 99.1% of bifunctional components with molecular weight between 400 and 700.

Example 3 (Comparative)

Preparation of Monofunctional Carboxylic Acids of Formula (I) Having a Molecular Weight Distribution in the Range 250-970

The Example 2 was repeated but by subjecting to fluorination the fraction DF prepared in the Example 1 having molecular weights between 276 and 1,000 and therefore with a molecular weight delta higher than 600.

250 g of the DF fraction are photochemically fluorinated (step b) at −20° C. for 8 hours with 1.5 Nl/h of gaseous $F_2$ until obtaining a product containing 49% of neutral end groups (perfluorinated alkyls).

209 g of this product, having equivalent weight equal to 500, are then hydrolyzed (step c2) with 7.51 g of water according to the methods indicated in the Example 2.

By using the rectification column described in the Example 2, 187 g of hydrolyzed product are rectified (step d) which by the gaschromatographic analysis results to contain 50% by weight of monofunctional compounds.

By distilling up to 107° C. with a vacuum of 50 mbar a first fraction (fraction A) of 38.6 g is obtained formed of a mixture of neutral and monofunctional compounds.

By distilling between 46° C. at 0.65 mbar and 79° C. at 0.23 mbar, 68.1 grams of fraction (fraction B) are obtained containing monofunctional acids with molecular weights in the range 370-670. The gaschromatographic analysis shows that fraction B has a purity in monofunctional components equal to 63.1%; the complement to 100 is formed of a mixture of bifunctional compounds and neutral compounds.

The yield of monofunctional compounds present in the fraction B is equal to 46.0% by weight of what contained in the distilled mixture (in 187 g).

The carboxylic acid structure determined by NMR is:

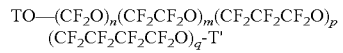

wherein m/n=1.96 and (p+q)/(m+n)=0.0063;

and the number average molecular weight is 502;
T and T' are the chain end groups —CF$_2$COOH (49.5% molar) and CF$_3$ (50.5% molar).

The attempt to further purify this mixture (fraction B) with rectification columns has not given substantial improvements of the product purity.

The residue (fraction C) is prevailingly formed of monofunctional compounds with molecular weights in the range 670-970 and bifunctional ones with molecular weights in the range 400-1,000. Also from the latter residue it was moreover not possible to recover the monofunctional components with a high purity degree, higher than 98%.

From the comparison of the data of the Example 2 with those of the Example 3 (comparative) it is evident that the fluorination of the carbonyl end groups of fractions having a molecular weight distribution width outside the ranges defined in the present invention does not allow to obtain high purity carboxylic monofunctional compounds even increasing the final rectification operation efficiency.

Therefore the obtainment by the distillation step a) of fractions having a molecular weight delta lower than 600 and the subsequent fluorination of the carbonyl end groups is essential for the obtainment of high purity monofunctional carboxylic compounds.

Example 4 (Comparative)

The Example 3 (comparative) was repeated but by using a different fluorination method and by carrying out a distillation of the carbonyl compounds according to patent application US 2004/0147780.

120 g of the DF fraction prepared in the Example 1, having molecular weights between 276 and 1,000 and with a molecular weight delta higher than 600, are catalytically fluorinated with the method indicated in patent application US 2004/0147780.

The initial mixture is fed into a 200 ml reactor together with 3 g of CsF previously anhydrified. The reaction is carried out at 70° C. by feeding 1 Nl/h of gaseous F$_2$ for 6 hours until obtaining 112 g of a mixture of products containing 50% of perfluorinated alkyl end groups.

The obtained mixture has an equivalent weight of 510 and a molar content of neutral compounds of 26%, monofunctional compounds of 50% and bifunctional compounds of 24%.

95.2 g of said mixture are then hydrolyzed with 3.36 g of water.

After HF removal, 88.2 g of hydrolyzed product are distilled by using the rectification column described in the Example 2.

By distilling between 42° C. (at 0.3 mbar) and 79° C. (at 0.25 mbar) 41.3 g of a fraction containing monofunctional compounds having molecular weights in the range 370-670 are obtained. The gaschromatographic analysis of this fraction shows that it has a purity in monofunctional components equal to 62.9%, the remaining portion being formed of 20.6% of neutral compounds and 16.5% of bifunctional compounds.

The yield of monofunctional compounds isolated by distillation resulted equal to 59% by weight of what contained in the distilled mixture.

The carboxylic acid structure is:

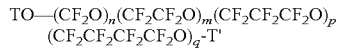

wherein m/n=1.96 and (p+q)/(m+n)=0.0064;
and the number average molecular weight is 496;
T and T' are the chain end groups —CF$_2$COOH (48.5% molar) and CF$_3$ (51.5% molar).

The attempt to further purify this mixture with rectification columns has not given substantial improvements of the product purity.

The residue of said distillation is formed of a mixture of monofunctional compounds with molecular weights in the range 670-970 and of bifunctional ones with molecular weights in the range 400-1,000.

Also in this case, the attempt to further purify the mixture with rectification columns has not given substantial improvements in purity, not obtaining high purities, higher than 98%.

From the comparison of the data of the Example 2 with those of the Example 4 (comparative) it results that the distillation step a) of the process of the present invention carried out before fluorination is essential for obtaining high purity carboxylic monofunctional compounds.

This is unexpected as the prior art does not teach to obtain carboxylic monofunctional compounds with high purity and yield by subjecting to fluorination diacylfluorides (dicarbonyls) having a predetermined molecular weight distribution width.

As a matter of fact it is evident from the Examples that, starting from diacylfluorides having a molecular weight delta outside the claimed range, it is not possible to obtain high purity carboxylic monofunctional compounds even increasing the rectification operation efficiency and using a catalytic fluorination technique, as described in patent application US 2004/0147780, which is known to be selective for the synthesis of monofunctional compounds.

Example 5 (Comparative)

Separation of Carboxylic Monofunctional Compounds by Silica Gel 10 g of the mixture obtained from the hydrolysis step of the Example 2 containing carboxylic acids are introduced in a chromatographic column having 2.5 cm diameter and 60 cm height and filled with 100 grams of silica gel by using the same separation procedure described in U.S. Pat. No. 5,246,588, U.S. Pat. No. 5,262,057 and U.S. Pat. No. 5,910,614, to separate the monofunctional compounds from the bifunctional and neutral ones without being subjected to the rectification step d).

The elution with mixtures of fluorinated solvents and polar solvents, as suggested by U.S. Pat. No. 5,910,614, allows the separation of neutral components (2.4 g with yield 96% by weight) but the acid components (mono and bifunctional) cannot be either recovered or separated since they remain adsorbed on the column silica gel.

Example 6

Preparation of a Fraction of Monofunctional Carboxylic Acids of Formula (I) Having a Molecular Weight Distribution in the Range 670-970

210 g of the fraction 3 (residue) of diacylfluorides obtained in the Example 1, having molecular weight in the range 700-1,000, are photochemically fluorinated (step b) at 20° C. for 6.5 hours with 1 Nl/h of gaseous F$_2$ until obtaining a product containing 51% of neutral end groups and equivalent weight 834.

192 g of fluorinated product are then hydrolyzed (step c) with 4.15 g of water according to the method indicated in the Example 2.

188.9 g of the so obtained mixture which, analyzed by gaschromatography, results to contain 50% by weight of carboxylic monofunctional compounds, are rectified (step d) at the pressure of 0.22 mbar in the temperature range between 79° C. and 107° C.

89.7 g of product are obtained which, subjected to gaschromatographic analysis, shows a purity in carboxylic monofunctional components equal to 98.7% and has molecular weights in the range 670-970.

The yield in the monofunctional compound recovered in distillation is equal to 93.8%.

The structure of the monofunctional carboxylic acid is:

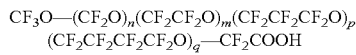

wherein m/n=1.98 and (p+q)/(m+n)=0.0031;
and the number average molecular weight is 818.

A second rectification of this product has increased the purity obtaining a value higher than 99.9%.

Example 7

Preparation of a Fraction of Monofunctional Carboxylic Acids of Formula (I) Having a Molecular Weight Distribution in the Range 970-1,270

260 g of the fraction 4 obtained in the Example 1, containing diacylfluorides having molecular weight in the range 1,000-1,300, are photochemically fluorinated (step b) at 20° C. for 4.5 hours with 1.5 Nl/h of gaseous $F_2$ until obtaining a product containing 51% of neutral end groups and having equivalent weight equal to 1,079.

243 g of fluorinated product are then hydrolyzed (step c2) with 4.06 g of water according to the method indicated in the Example 2.

239 g of the obtained product, containing 50.8% by weight of carboxylic monofunctional compounds, are rectified (step d) at the pressure of 0.21 mbar in the temperature range between 106° C. and 137° C.

115.6 g of product are obtained which, subjected to gaschromatographic analysis, shows a purity in carboxylic monofunctional components equal to 98.2% and having molecular weights in the range 970-1,270.

The yield in the carboxylic monofunctional compound recovered in distillation is equal to 93.5%.

The structure of the monofunctional carboxylic acid is:

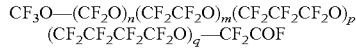

wherein m/n=1.98 and (p+q)/(m+n)=0.0116;
and the number average molecular weight is 1,059.

A second distillation of this product has increased the purity obtaining a value equal to 99.8%.

Example 8

Preparation of a Fraction of Benzyl Esters of Formula (I) Having a Molecular Weight Distribution in the Range 460-1,060

215 g of the fraction 8 obtained in the Example 1, containing diacylfluorides having molecular weight in the range 400-1,000, are photochemically fluorinated at −20° C. for 5.5 hours with 1.5 Nl/h of gaseous $F_2$ until obtaining a product containing 48% of neutral end groups and having equivalent weight equal to 610.

192 g of fluorinated product are then esterified with 34.01 g (stoichiometric amount) of benzyl alcohol by applying the method indicated in the Example 2.

By using the rectification column described in the Example 2, 191 g of product, containing 49.6% by weight of monofunctional benzyl esters, are rectified.

By distilling between 108° C. (at 0.26 mbar) and 149° C. (at 0.23 mbar), 93.6 g of fraction of monofunctional ester (fraction B) having molecular weights in the range 460-1,060, are obtained.

The GC analysis of this fraction shows that it has a purity in monofunctional components equal to 99.5%, the remaining part being non functional compounds.

The yield in monofunctional compounds isolated by distillation resulted equal to 98.3% by weight of what contained in the distilled mixture (191 g).

The formula of the monofunctional ester is:

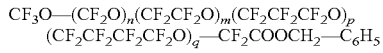

wherein m/n=1.96 and (p+q)/(m+n)=0.0045;
and the number average molecular weight is 720.

The result obtained in this Example shows that, if there is a molecular weight delta equal to 600, it is possible to obtain a very high purity in monocarboxylic compound, higher than 99%, by using as esterification agent the benzylic alcohol.

Example 9

Preparation of a Fraction of Butyl Esters of Formula (I) Having a Molecular Weight Distribution in the Range 420-720

142.3 g of fluorinated product obtained in the Example 2, containing 50% of neutral end groups and having an equivalent weight equal to 514, are esterified by reacting them with 20.5 g of 1-butanol and distilling the formed HF according to the methods previously described. The obtained ester, analyzed by gaschromatography, results to contain 50% by weight of monofunctional compounds.

143.8 g of the product obtained by esterification are rectified by using the rectification column described in the Example 2 at the pressure of 47-48 mbar in the temperature range 105° C.-147° C.

70.6 g of product are obtained which, by the gaschromatographic analysis, shows a purity in ester monofunctional components equal to 99.1%. The yield in the monofunctional compound recovered is equal to 97.3%.

The structure of the monofunctional carboxylic ester is:

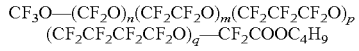

wherein m/n=1.96 and (p+q)/(m+n)=0.0060;
and the number average molecular weight is 569.

A second rectification of this product has increased the purity obtaining a value higher than 99.9%.

Example 10

Preparation of a Fraction of Methyl Esters of Formula (I) Having a Molecular Weight Distribution in the Range 480-680

295 g of the fraction 2 obtained in the Example 1 are rectified at atmospheric pressure with a 5 plate AISI column up to the temperature of 112° C. so as to obtain a fraction having a very low molecular weight delta, approximately 200.

209.5 g of a fraction are obtained, having molecular weights in the range 500-700, which at the analysis results to have a structure:

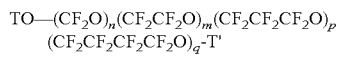

wherein m/n=1.96 and (p+q)/(m+n)=0.0053;
T and T' are the chain end groups —$CF_2COF$ and the number average molecular weight is 591.

122 g of the fraction of diacylfluorides obtained above are photochemically fluorinated at −25° C. for 5.5 hours with 1 Nl/h of gaseous $F_2$ until obtaining a product containing 53% of neutral end groups and having equivalent weight equal to 596.

The fluorinated product (115.5 g) is then esterified with 6.2 g of methanol by following the same method used for the hydrolysis in the Example 2.

98.1 g of esterified product, which by gaschromatographic analysis shows a content in carboxylic monofunctional components equal to 49.8% by weight, are rectified at the pressure of 51 mbar in the temperature range 96° C.-138° C.

47.9 g of the product are obtained which by gaschromatographic analysis shows a purity in carboxylic monofunctional components equal to 98.9% having molecular weights in the range 480-680. The yield in monofunctional compound recovered is equal to 97%.

The structure of the monofunctional methyl ester is:

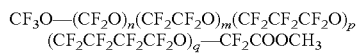

wherein m/n=1.97 and (p+q)/(m+n)=0.0052;
and the number average molecular weight is 578.

A second rectification of this product has increased the purity obtaining a value higher than 99.9%.

Example 11

Preparation of a Fraction of Methyl Esters of Formula (I) Having a Molecular Weight Distribution in the Range 194-260

100.4 g of the light fraction LF of acylfluorides obtained in the Example 1, mainly formed of a mixture of:

| | |
|---|---|
| $FCOCF_2OCF_2COF$ | 85.3% molar, |
| $FCOCF_2OCF_2OCF_2COF$ | 13.3% molar, |
| $FCOCF_2OCF_2CF_2OCF_2COF$ | 1.4% molar, | are photochemically fluorinated at −40° C. with 1 Nl/h of gaseous $F_2$ for 13 hours until converting 55% of the acylfluoride end groups of the $FCOCF_2OCF_2COF$ species.

The fluorinated mixture (69.5 grams) has the following molar composition:

| | |
|---|---|
| $FCOCF_2OCF_2COF$ | 22.5% |
| $FCOCF_2OCF_2OCF_2COF$ | 3.5% |
| $FCOCF_2OCF_2CF_2OCF_2COF$ | 0.4% |
| $CF_3OCF_2COF$ | 54.9% |
| $CF_3OCF_2OCF_2COF$ | 8.6% |
| $CF_3OCF_2CF_2OCF_2COF$ | 0.9% |
| $CF_3OCF_3$ | 3.4% |
| $CF_3OCF_2OCF_3$ | 5.3% |
| $CF_3OCF_2CF_2OCF_3$ | 0.5% |

The mixture is esterified by reacting it with 13 g of methanol at −20° C., then distilling the formed HF according to the methods already described.

64.8 g of a mixture are obtained, which is rectified at atmospheric pressure obtaining 34.0 g (yield 96.8%) of the ester $CF_3OCF_2COOCH_3$ with GC purity higher than 99.9% and 7.3 g (yield 96.1%) of the ester $CF_3OCF_2OCF_2COOCH_3$ with purity of 99.0%.

5 g of the ester $CF_3OCF_2OCF_2COOCH_3$ are rectified with SPALTHOR Fisher column (theoretic 90 plates). The purity of the obtained product is higher than 99.9%.

Example 12

Preparation of a Fraction of Branched Chain Carboxylic Acids of Formula (I) Having a Molecular Weight Distribution in the Range 570-870

According to U.S. Pat. No. 5,488,181 and U.S. Pat. No. 3,847,978, 980 g of acylfluoride are prepared having the general formula:

wherein a/b=1.44 and (c+d)/(a+b)=0.1053;
T and T' are the chain end groups —$CF_3$ (9.8% molar), —$CF_2CF_3$ (1.2% molar), —$CF_2COCF_3$ (13.0% molar), —$CF(CF_3)COF$ (16.5% molar) and —$CF_2COF$ (59.5% molar).

A number average molecular weight (Mn) equal to 501 corresponds thereto.

900 g of diacylfluoride obtained as described is rectified in the equipment described in the Example 1 between 140° C. and 210° C. at atmospheric pressure. A fraction of 197.6 g having molecular weights in the range 600-900 is obtained.

This fraction has formula:

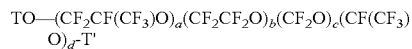

wherein a/b=1.45 and (c+d)/(a+b)=0.1049;
T and T' are the chain end groups —$CF_3$ (9.0% molar), —$CF_2CF_3$ (1.2% molar), —$CF_2COCF_3$ (12.5% molar), —$CF(CF_3)COF$ (17.0% molar) and —$CF_2COF$ (60.3% molar).

A Mn equal to 744 corresponds thereto.

153.7 g of this fraction are photochemically fluorinated at 20° C. for 6 hours with 1 Nl/h of gaseous $F_2$ until obtaining a product containing 60% of the neutral end groups with equivalent weight equal to 878.

143.4 g of this product are hydrolyzed with 2.94 g of water according to the method indicated in the Example 2. The hydrofluoric acid generated is distilled up to 70° C.

81 g of hydrolyzed product which, at the gaschromatographic analysis, shows a content in carboxylic monofunctional compounds of 47.8% by weight, are rectified with a glass column having a 3 cm diameter and 30 cm height filled with Rashig rings by operating at the pressure of 0.22-0.23 mbar in the temperature range 64° C.-101° C.

37.6 g of product are obtained, which at the gaschromatographic analysis shows a purity in monofunctional compounds of 99.6% and having molecular weights in the range 570-870. The yield in the recovered monofunctional compound is equal to 96.7%.

The structure of the monofunctional carboxylic acid is:

wherein a/b=1.44 and (c+d)/(a+b)=0.1053;

A are the neutral end groups —CF$_3$ (99%) and —CF$_2$CF$_3$ (1%) and —CFY—COOH are the acid end groups —CF(CF$_3$)COOH (20.1%) and —CF$_2$COOH (79.9% molar); and the number average molecular weight is 699.

Example 13 (Comparative)

Following the teaching of U.S. Pat. No. 3,715,378 and U.S. Pat. No. 4,451,646 a peroxidic PFPE is prepared which then is chemically reduced by catalytic hydrogenation described in US 2004/0024153 obtaining 2.5 kg of a PFPE diacylfluoride of formula (II), wherein R$_F$ is the structure (a), said diacylfluoride having formula:

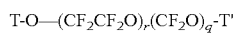

wherein
r/q=2.5; T, T', equal to or different from each other, are the following chain end groups: —CF$_3$ (1.2% molar); —CF$_2$COF (98.8% molar). The number average molecular weight is 620.

The diacylfluoride is then subjected to distillation to draw two grades having the same molecular weight distribution as those industrially used to prepare commercial products: the first grade, having molecular weights between 250 and 900, is industrially used as intermediate to prepare the commercial products H-Galden®. The second grade, having molecular weights between 900 and 3,500, is industrially used as intermediate to prepare the commercial products Fluorolink®.

The first grade, having molecular weights between 250 and 900 and number average molecular weight 462, is then used as precursor of carboxylic monofunctional PFPEs and subjected to photochemical fluorination, hydrolysis and distillation according to the following procedure.

250 g of the first grade are fluorinated (step b) by photochemical fluorination by feeding at atmospheric pressure 1.5 Nl/h of gaseous F$_2$ into the reactor maintained at –20° C. After 7.5 hours of reaction a product containing 42.8% of perfluorinated alkyl end groups —CF$_3$ is obtained.

Then 108 g of fluorinated product having an equivalent weight of 383 are hydrolyzed (step c2), by following the method indicated in the previous Examples, 5.08 g of water are added. An aliquot of 87 g of mixture obtained from hydrolysis, which results to contain 48.5% by weight of monofunctional compounds, is then rectified (step d) in a glass column. By distilling at atmospheric pressure up to 133° C., 6.7 g of a fraction formed of neutral compounds having molecular weights in the range 200-500 are obtained; then by distilling at 46 mbar between 74° C. and 139° C., 30.7 g of a fraction containing carboxylic monofunctional PFPEs of formula (I) having molecular weights in the range 220-570 are obtained.

The second fraction results to have a purity in carboxylic monofunctional PFPEs of formula (I) of 74% and contains 26% of neutral compounds.

The yield in the recovered monofunctional compound is equal to 46.2% by weight with respect to what contained in the mixture. The distillation residue of step d), equal to 49.1 g, is formed of 61% of bifunctional components with molecular weight between 250 and 900. The remaining part 39% is mainly formed of monofunctional compounds having molecular weights in the range 570-870.

Another aliquot of 120 g of fluorinated product with molecular weight between 250 and 900 and having an equivalent weight of 303 is esterified (step c1) with the methods indicated in the previous Examples, by adding 33.85 g of benzylic alcohol. 108 g of this mixture of esters, which result to contain 47.4% by weight of monofunctional compounds, are rectified (step d) in a glass column.

One distils at atmospheric pressure up to 210° C. obtaining 14.9 g of a fraction formed of neutral compounds having molecular weights in the range 200-850; then one distils at 0.23 mbar between 98° C. and 144° C. obtaining 53.7 g of a fraction containing carboxylic monofunctional PFPEs of formula (I) having molecular weights in the range 310-950.

The second fraction has a purity in carboxylic monofunctional PFPEs of formula (I) of 94% and contains 6% of bifunctional compounds having molecular weights lower than 480. The yield in the recovered monofunctional compound is equal to 98.5% by weight with respect to what contained in the mixture.

The attempts to purify this fraction with successive distillations with rectification columns have not allowed to obtain improvements in the monofunctional purity over 94%.

The distillation residue, equal to 38.4 g, is formed of 97.9% of bifunctional components with molecular weight in the range 480-1,080. The remaining part 2.3% is formed of carboxylic monofunctional compounds with molecular weight higher than 950.

Example 14 (Comparative)

The second grade of diacylfluoride obtained in the Example 13, having molecular weights between 900 and 3,500 and number average molecular weight of 1,560, is used as precursor of carboxylic monofunctional PFPEs and subjected then to photochemical fluorination, esterification and distillation according to the following procedure.

200 g of the second grade are fluorinated by photochemical fluorination according to U.S. Pat. No. 4,664,766, by feeding at atmospheric pressure 1 Nl/h of gaseous F$_2$ into the reactor maintained at –20° C. After 3 hours of reaction a product containing 45% of perfluorinated alkyl end groups —CF$_3$ is obtained.

Then 102 g of fluorinated product having an equivalent weight of 1,390, are hydrolyzed with 1.32 g of water. An aliquot of 95 g of mixture obtained by hydrolysis, which contains 49.4% by weight of monofunctional compounds, is then rectified.

One distils at 0.20 mbar up to 92° C. obtaining 2.3 g of a fraction formed of neutral compounds having molecular weights in the range 850-1,150; then one distils at 0.32 mbar between 95° C. and 127° C. obtaining 7.6 g of a fraction containing carboxylic monofunctional PFPEs of formula (I) having molecular weights in the range 870-1,170.

The latter fraction has a purity in carboxylic monofunctional PFPEs of formula (I) of 71.3% and contains 28.7% of neutral compounds with molecular weight in the range 1,170-1,470.

The yield in the recovered monofunctional compound is equal to 12% by weight with respect to what contained in the mixture.

A distillation residue remains, equal to 82.3 g, formed of 34% of bifunctional components with molecular weight between 900 and 3,500. The remaining part 66% is formed of monofunctional compounds having molecular weight higher than 1,270 and of neutral compounds with molecular weight higher than 1,450.

Example 15 (Comparative)

As reported in the Example 1 of patent application US 2004/0147780, following the teaching of U.S. Pat. No. 5,258, 110 and U.S. Pat. No. 3,847,978, 500 g of a PFPE diacylfluoride of formula (II) are prepared wherein $R_F$ is the structure (a), whose formula determined by NMR is:

$$T-O-(CF_2CF_2O)_r(CF_2O)_q-T'$$

wherein r/q=4.3,

T, T', equal to or different from each other, are the following chain end groups: —$CF_2CF_3$ (9% molar); —$CF_2COF$ (91% molar). The number average molecular weight is 620 and the molecular weights are in the range 210-3,000.

100 g of diacylfluoride are catalytically fluorinated with the method indicated in the patent application US 2004/0147780.

The initial mixture is fed into a 200 ml reactor together with 12.5 g of previously anhydrified CsF. The reaction is carried out at 90° C. by feeding 500 Nml/h of gaseous $F_2$, diluted with the same helium flow-rate, for 8.5 hours until obtaining a mixture of products containing 51% of perfluorinated alkyl end groups —$CF_3$ (42%) and —$CF_2CF_3$ (9%).

The obtained mixture results to have an equivalent weight of 608 and a molar content of neutral compounds of 23%, of monofunctional compounds of 56% and of bifunctional compounds of 21%.

20.5 g of this mixture containing carbonyl compounds are separated by fractional distillation in a 90 theoretic plate Spaltror-Fisher column: 10 fractions each of 2 g are collected, which, analyzed by gaschromatography, show a relative weight composition of monofunctional, bifunctional and neutral compounds substantially identical to that of the mixture fed in the column.

This is an index of the impossibility to separate the monoacylfluorides from the corresponding diacylfluorides with high purity. 75 g of said mixture are then hydrolyzed with 2.24 g of water.

After HF removal, 68 g of hydrolyzed product are distilled by using the rectification column described in the Example 2.

By distilling at atmospheric pressure up to 112° C., 1.4 g of neutral compounds with molecular weight lower than 450, are obtained. Then one distils at 54 mbar between 62° C. and 126° C. and 5.6 g of a fraction containing monofunctional compounds with molecular weights lower than 470 are obtained. The gaschromatographic analysis of this fraction shows that it has a purity in monofunctional components equal to 71%, the remaining part being formed of 29% of neutral compounds having molecular weights in the range 450-750. The yield of monofunctional compounds isolated by distillation resulted equal to 10% by weight of what contained in the distilled mixture.

The attempt to further purify this mixture with rectification columns has not given substantial improvements of the product purity.

The residue of said distillation is formed of a mixture of neutral compounds with molecular weight higher than 750, of monofunctional compounds with molecular weights higher than 470 and of bifunctional ones with molecular weights in the range 210-3,000.

Also in this case, the attempt to further purify the mixture with rectification columns has not given substantial improvements in the purity, not obtaining high purities, higher than 98%.

From the comparison of the data of this Example with those of the Examples according to the invention it results that the distillation step a) of the process of the present invention carried out before the fluorination, is essential for obtaining high purity carboxylic monofunctional compounds.

Example 16

The cut of diacylfluoride of the Example 13, having molecular weights between 250 and 900 and number average molecular weight 462, is subjected to the rectification step a) until obtaining a fraction having a molecular weight delta lower than 600.

The obtained product, having molecular weights in the range 350-900 and number average molecular weight 493, is then subjected to photochemical fluorination, esterification and distillation according to the following procedure.

250 g of the above prepared fraction, having number average molecular weight (Mn) equal to 493, are photochemically fluorinated by feeding at atmospheric pressure 1.5 Nl/h of gaseous $F_2$ into the reactor maintained at −20° C. After 8 hours of reaction a product containing 43.0% of perfluorinated alkyl end groups —$CF_3$ is obtained.

120 g of the fluorinated product having an equivalent weight of 410, are esterified by adding the stoichiometric amount of benzylic alcohol (31.51 g). An aliquot of 117 g of mixture obtained by esterification, which contains 48.7% by weight of monofunctional compounds, is then rectified in a glass column.

One distils at atmospheric pressure up to 210° C. obtaining 20.2 g of a fraction formed of neutral compounds having molecular weights in the range 300-850; then one distils at 0.22 mbar between 104° C. and 144° C. obtaining 57.2 g of a fraction containing carboxylic monofunctional PFPEs of formula (I) having molecular weights in the range 410-960.

The latter fraction has a purity in carboxylic monofunctional PFPEs of formula (I) of 99.3% and contains 0.7% of neutral compounds.

The yield in the recovered monofunctional compound results equal to 95.8% by weight with respect to what contained in the distilled mixture.

The structure formula of the ester determined by NMR results:

$$CF_3-O-(CF_2CF_2O)_r(CF_2O)_q-CF_2COOCH_2C_6H_5$$

wherein r/q=2.5. The number average molecular weight is 553.

The distillation residue weighs 421.3 g and is formed of 94.2% of bifunctional components with molecular weight between 530 and 1,080.

The invention claimed is:

1. A process for preparing monocarboxylic perfluoropolyethers of formula:

$$A-O-(R_F)_z-(CFY)_t-C(O)OX \quad (I)$$

wherein:
X=H, a linear or branched, when possible, alkyl radical R with a number of carbon atoms between 1 and 10, or a $C_5$-$C_7$ cyclic radical, optionally containing one or more heteroatoms;

Y=F, $CF_3$;

t is an integer from 1 to 3, t=1 when Y=$CF_3$; t=1, 2 or 3 when Y=F;

A is a linear or branched, when possible, $C_1$-$C_4$ perfluoroalkyl end group, one fluorine atom can be substituted by one chlorine atom;

z is an integer 0 or 1;

$R_F$ is a perfluorooxyalkylene chain containing one or more of the following units statistically distributed along the backbone: ($C_3F_6O$), (CFYO) wherein Y is F or $CF_3$; ($CF_2CF_2O$), ($CF_2CF_2CF_2O$), ($CF_2CF_2CF_2CF_2O$), having molecular weight or number average molecular weight in the range 180-8,000;

comprising the following steps:

a) one or more distillations of perfluoropolyethers of formula:

$$T-O-(R_F)_z-T' \quad (II)$$

wherein:

z and $R_F$ are as above;

T, T', equal to or different from each other, are selected from the functional end groups —$CF_2COF$, —$CF(CF_3)COF$, —$CF_2CF_2COF$, —$CF_2CF_2CF_2COF$, —$CF_2C(O)CF_3$, —COF, and the non functional (neutral) end groups —$CF_3$, —$CF_2CF_3$, —$C_3F_7$, —$C_4F_9$, one fluorine atom can be substituted by one chlorine atom, with the proviso that, when present, the neutral end groups are 20% molar at most with respect to the total of the end groups T and T';

to obtain a PFPE fraction of formula (II) wherein the difference between the minimum and the maximum molecular weight of the components, defined as molecular weight delta, is lower than or equal to 600, by operating at temperatures between −50° C. and +300° C. and at a pressure between $10^{-3}$ mbar and 4 bar;

b) partial fluorination of the fraction obtained in a) until obtaining a content of neutral end groups from 40% to 60% molar with respect to the total of the end groups;

c) esterification c1) and/or hydrolysis c2) as follows:

c1) esterification of the mixture obtained in b) with an alcohol of formula R—OH wherein R is as above, in stoichiometric amount with the functional acylfluoride end groups of the mixture obtained in b) and distillation of the formed HF;

or c2) hydrolysis of the mixture obtained in b) with water used in stoichiometric ratio with the functional acylfluoride end groups of the mixture obtained in b), by distilling the formed HF;

d) distillation of the product obtained in c1) or in c2) by operating at temperatures from +20° C. to +300° C. and under a pressure between $10^{-3}$ mbar and 4 bar, so as to obtain a mixture of compounds of formula (I) wherein the molecular weight delta of the components of the mixture is the same of the fraction of the perfluoropolyethers of formula (II) obtained in step a).

2. A process according to claim 1, wherein $R_F$ is selected from the following classes:

(a) —$(CF_2O)_n(CF_2CF_2O)_m(CF_2CF_2CF_2O)_p(CF_2CF_2CF_2CF_2O)_q$— wherein m, n, p, q are integers, zero comprised, such as to give the number average molecular weights as above; when n is different from zero m/n is between 0.1 and 20; when (m+n) is different from zero (p+q)/(m+n) is between 0 and 0.2, extremes included;

(b) —$(CF_2CF(CF_3)O)_a(CF_2CF_2O)_b(CF_2O)_c(CF(CF_3)O)_d$— wherein a, b, c, d are integers, zero comprised, such as to give the number average molecular weights as above; when b is different from zero a/b is between 0.1 and 10; when (a+b) is different from zero (c+d)/(a+b) is between 0.01 and 0.5;

(c) —$(CF_2CF(CF_3)O)_e(CF_2O)_f(CF(CF_3)O)_g$— wherein e, f, g are integers, zero comprised, such as to give the number average molecular weights as above; when e is different from zero (f+g)/e is between 0.01 and 0.5.

3. A process according to claim 1, wherein step b) can be carried out by photochemical and/or thermal and/or catalytic way.

4. A process according to claim 1, wherein in step b) fluorination is carried out until obtaining a content of neutral end groups in the range 40%-50%.

5. A process according to claim 1, wherein, when the esterification c1) is carried out, the R group is selected from:

when the delta is lower than or equal to 200
R is a linear, branched when possible $C_1$-$C_{10}$ alkyl group or cyclic when possible, optionally containing one or more heteroatoms or an aryl;

when the delta is between 200 and 300 (300 included)
R=linear, branched or cyclic when possible $C_4$-$C_{10}$ alkyl, optionally containing one or more hetero-atoms; or an aryl;

when the delta is between 300 and 400 (400 included)
R=linear, branched or cyclic $C_6$-$C_{10}$ alkyl, optionally containing one or more heteroatoms; or an aryl;

when the delta is between 400 and 500 (500 included)
R=linear, branched or cyclic $C_7$-$C_{10}$ alkyl, optionally containing one or more heteroatoms; or an aryl;

when the delta is between 500 and 600 (600 included)
R=linear, branched or cyclic $C_8$-$C_{10}$ alkyl, optionally containing one or more heteroatoms; or an aryl.

6. A process according to claim 1, wherein, when the hydrolysis c2) is carried out, the molecular weight delta of the compounds of formula (II) obtained from step a) is lower than or equal to 300.

7. The process according to claim 1, wherein the one or more heteroatoms of X is oxygen.

8. The process according to claim 1, wherein the aryl of X is a benzyl radical.

9. The process according to claim 1, wherein when the end groups A contain chlorine, the end groups containing chlorine are lower than 2% molar with respect to the total of the end groups A.

10. The process according to claim 1, wherein the molecular weight or number average molecular weight of $R_F$ is in the range of 180-3,000.

11. The process according to claim 1, wherein the molecular weight or number average molecular weight of $R_F$ is in the range of 200-1,600.

12. The process according to claim 1, wherein when the end groups T, T' contain chlorine, the end groups containing chlorine are lower than 1% molar with respect to the total of the end groups T and T'.

13. The process according to claim 1, wherein distillation of the product obtained in c1) or in c2) is operated under a pressure between $10^{-3}$ mbar and atmospheric pressure.

14. The process according to claim 2, wherein when (a+b) is different from zero (c+d)/(a+b) is between 0.01 and 0.2.

15. The process according to claim 2, wherein when e is different from zero (f+g)/e is between 0.01 and 0.2.

16. The process according to claim 3, wherein step b) is carried out by photochemical way.

17. The process according to claim 5, wherein when the delta is lower than or equal to 200, the one or more heteroatoms of R is oxygen.

18. The process according to claim 5, wherein when the delta is lower than or equal to 200, the aryl of R is a benzyl group.

19. The process according to claim 5, wherein when the delta is between 200 and 300 (300 included), the one or more heteroatoms of R is oxygen.

20. The process according to claim 5, wherein when the delta is between 200 and 300 (300 included), the aryl of R is benzyl group.

21. The process according to claim 5, wherein when the delta is between 300 and 400 (400 included), the one or more heteroatoms of R is oxygen.

22. The process according to claim 5, wherein when the delta is between 300 and 400 (400 included), the aryl of R is benzyl group.

23. The process according to claim 5, wherein when the delta is between 400 and 500 (500 included), the one or more heteroatoms of R is oxygen.

24. The process according to claim 5, wherein when the delta is between 400 and 500 (500 included), the aryl of R is benzyl group.

25. The process according to claim 5, wherein when the delta is between 500 and 600 (600 included), the one or more heteroatoms of R is oxygen.

26. The process according to claim 5, wherein when the delta is between 500 and 600 (600 included), the aryl of R is benzyl group.

* * * * *